Oct. 9, 1928.  
C. R. WALCOTT  
1,687,115

LINE PROJECTING DEVICE

Filed Feb. 10, 1927

INVENTOR  
Colin R. Walcott  
BY Cyrus W. Rice  
ATTORNEY

Witness:  
Geo. L. Chapel

Patented Oct. 9, 1928.

1,687,115

UNITED STATES PATENT OFFICE.

COLIN R. WALCOTT, OF NEWAYGO, MICHIGAN.

LINE-PROJECTING DEVICE.

Application filed February 10, 1927. Serial No. 167,141.

The present invention relates to line-projecting devices, and more particularly, to devices which are adapted for projecting visible linear marks on roads and streets.

The main objects of the invention are to provide such a device whereby visible road-center lines may be projected; to provide such a device whereby visible lines may be marked on streets for the better regulation of automobile parking; and to provide such a device which is simple in construction and convenient in use.

An illustrative embodiment of the invention is shown in the accompanying drawings wherein.

Figure 1:
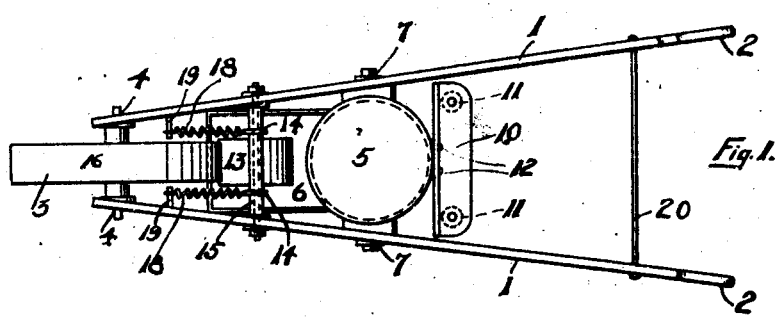
Figure 1 is a top plan view of the device.
Figure 2:
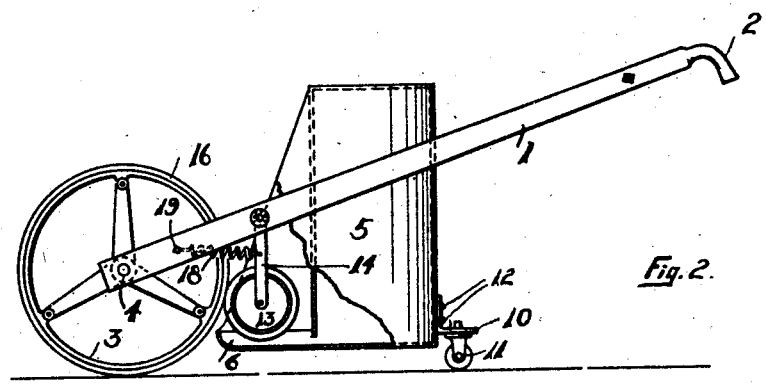
Figure 2 is a front elevation thereof, certain parts being broken away to better show its construction.

In the construction shown, a pair of guide members 1 each provided with a handle portion 2 at one end, have a line-projecting wheel 3 rotatably mounted at 4 between them. A vacuum tank 5 for containing marking pigment has at its bottom a laterally disposed open pan 6 integral therewith and communicating with the interior thereof. The tank is pivotally mounted between the guide members 1 as by its trunnions 7 turning in bearings on the guide members.

An angle iron tank supporting member 10, having traction casters 11, is rigidly secured to the tank as by the rivets 12. A rotatable pigment transferring wheel 13 is mounted between the depending supports 14 which are pivotally secured to the cross member 15. The wheel 13 is adapted to dip in the marking pigment within the pan 6 during its rotation and its periphery is yieldingly or tensionally held in contact with the felt tire 16 of the wheel 3 as by the coil springs 18 which are secured to the projecting lugs 19 on the guide members. A bracing member 20 secured to and between the guide members near the handle portions is provided for rigid construction.

The vacuum tank is filled with the marking pigment by tipping it rearside downwardly. In operation, the marking pigment is fed to the line-projecting wheel by means of the pigment-transferring wheel 13 whose periphery tensionally contacts the felt tire of the line-projecting wheel. The rotation of the line-projecting wheel rotates the pigment-transferring wheel whose periphery dips in the pigment within the pan. The vacuum within the tank prevents the pigment from flowing over the edges of the pan.

The supporting wheels—i. e., the line-projecting wheel 3 and the two casters 11—are disposed triangularly on the roadway, so that the structure may rest upright thereon.

While but one specific embodiment has been herein shown and described, it will be understood that numerous changes may be made without departing from the spirit of the invention as defined in the following claims.

I claim:

1. In a line-projecting device, a pair of rearwardly-diverging guide members; a line-projecting wheel rotatably mounted between their forward ends; a vacuum tank supported by and between said members and adapted to contain liquid marking pigment; an open-top vessel adjacent the bottom of the vacuum tank and communicating with the interior thereof; a cross member extending between the guide members; a pair of supporting arms pivotally mounted on and depending from the cross member; a pigment-transferring wheel rotatably mounted on and between the arms, the periphery of the pigment-transferring wheel being adapted to dip into the pigment in the vessel and to directly contact the periphery of the line-projecting wheel; springs urging the arms and the pigment-transferring wheel toward the line-projecting wheel.

2. In a line-projecting device, a pair of rearwardly-diverging guide members; a line-projecting wheel rotatably mounted between their forward ends; a vacuum tank supported by and between said members and adapted to contain liquid marking pigment; an open-top vessel adjacent the bottom of the vacuum tank and communicating with the interior thereof; a cross member extending between the guide members; a pair of supporting arms pivotally mounted on and depending from the cross member; a pigment-transferring wheel rotatably mounted on and between the arms, the periphery of the pigment-transferring wheel being adapted to dip into the pigment in the vessel and to directly contact the periphery of the line-projecting wheel; springs urging the arms and the pigment-transferring wheel toward the line-projecting wheel; independently operating casters forming with the line-projecting wheel a triangular support for the device.

In testimony whereof I have hereunto set my hand at Newaygo, Michigan, this 5th day of February, 1927.

COLIN R. WALCOTT.